United States Patent [19]
Hamlin, Jr. et al.

[11] Patent Number: 5,157,655
[45] Date of Patent: Oct. 20, 1992

[54] APPARATUS FOR GENERATING A DS-3 SIGNAL FROM THE DATA COMPONENT OF AN STS-1 PAYLOAD SIGNAL

[75] Inventors: Robert W. Hamlin, Jr.; Daniel C. Upp, both of Southbury, Conn.

[73] Assignee: TranSwitch Corp., Shelton, Conn.

[21] Appl. No.: 606,482

[22] Filed: Oct. 31, 1990

[51] Int. Cl.$^5$ .............................................. H04J 3/22
[52] U.S. Cl. ..................................... 370/84; 370/94.2; 370/102
[58] Field of Search ................ 370/84, 60, 60.1, 94.1, 370/94.2, 110.1, 102, 105.3; 375/112, 118, 119, 120; 328/55

[56] References Cited

U.S. PATENT DOCUMENTS

| | | | |
|---|---|---|---|
| 4,053,715 | 10/1977 | Drapkin | 370/102 |
| 4,159,535 | 6/1979 | Fuheman | 325/118 |
| 4,513,427 | 4/1985 | Borriello et al. | 375/110 |
| 4,551,830 | 11/1985 | Huffman | 370/102 |
| 4,667,324 | 5/1987 | Graves | 375/112 |
| 4,674,088 | 6/1987 | Grover | 370/102 |
| 4,685,101 | 8/1987 | Segal et al. | 370/102 |
| 4,833,673 | 5/1989 | Chao et al. | 370/102 |
| 5,033,064 | 7/1991 | Upp | 370/102 |
| 5,052,025 | 9/1991 | Duff et al. | 328/55 |

*Primary Examiner*—Douglas W. Olms
*Assistant Examiner*—Wellington Chin
*Attorney, Agent, or Firm*—David P. Gordon

[57] ABSTRACT

An apparatus which receives a gapped data component of an STS-1 signal and provides therefrom an ungapped DS-3 data signal is provided and includes a FIFO for receiving the data component of the STS-1 signal, a measuring circuit having an input clock related to the STS-1 signal and the output clock of the apparatus as inputs for effectively measuring the relative fullness of the FIFO, and a voltage controlled crystal oscillator (VCXO) for receiving a control signal from the measuring circuit and for generating the output clock of the apparatus in response thereto, where data in the FIFO is taken out of the FIFO as the DS-3 signal according to the rate of the output clock. The FIFO is preferably a byte wide RAM, and the measuring circuit is comprised of two counters, an XOR gate, and a low pass filter. One counter receives the apparatus output clock as its input, while the other counter receives a gapped STS-1 data payload input clock as its input. The msb's of the counters are compared by the XOR gate, and the duty cycle of the XOR gate output provides an indication of the difference between the rates of the input and output clocks. The low pass filter filters out high frequency changes in the duty cycle due to the gaps in the input clock, and provides the VCXO with a dc signal which changes with the long term average of the duty cycle. In response to this dc signal, the VCXO changes the output clock rate. By feeding back the output clock to one of the counters of the measuring circuit, a closed loop system is established.

20 Claims, 3 Drawing Sheets

R = FIXED STUFF
C = STUFF CONTROL
S = STUFF OPPORTUNITY
O = OVERHEAD COMMS

APPARATUS FOR GENERATING A DS-3 SIGNAL FROM THE DATA COMPONENT OF AN STS-1 PAYLOAD SIGNAL

BACKGROUND OF THE INVENTION

This invention generally relates to a desynchronizer for telecommunication signals. The invention more particularly relates to an apparatus for generating an ungapped DS-3 signal from the data component of a gapped STS-1 payload signal.

The telecommunications network servicing the Unites States and the rest of the world is presently evolving from analog transmission to digital transmission with ever-increasing bandwidth requirements. Fiber optic cable has proved to be a valuable tool of such evolution, replacing copper cable in nearly every application from large trunks to subscriber distribution plants. Fiber optic cable is capable of carrying much more information than copper with lower attenuation.

While fiber optic cable represents the future in telecommunications, presently there remains an entire telecommunications network comprised of various cable types, served by equipment of different vintages, and run according to various coexisting transmission standards. While older standards, cables, and equipment will be eventually phased out, for the time being it is necessary that all the old and new standards, equipment, and transmission lines be as compatible as possible. For example, in a wire plant, every signal should be connectable to every other signal. To achieve this, it is not enough to simply multiplex signals from lower to higher orders and vice-versa. In addition to a mux/demux function, signal format conversion operations must be performed before connectibility can be achieved. For instance, a DS-3 signal cannot simply be connected to an STS-1 signal as these signals are at different rates (51.84 MHz±20 ppm for the STS-1 signal, and 44.736 MHz±20 ppm for the DS-3 signal) and use different multiplexing formats. Thus, a conversion from a DS-3 signal to an STS-1 signal requires the addition of overhead bytes, stuff, control information, etc. which are accommodated in an increased data rate. Likewise, in recovering the DS-3 signal from the STS-1 signal in which it is carried, the overhead bytes, stuff, control information, etc. must be stripped out of the STS-1 signal as seen in the prior art FIG. 1, thereby producing gaps in the clock of the extracted DS-3 signal from which an ungapped slower DS-3 signal must be regenerated.

As seen in FIG. 1, for each row of ninety bytes of an STS-1 signal, three bytes of transport overhead and one byte of path overhead must be removed. Of the remaining eighty-six bytes, six bytes of fixed stuff (R) must be removed, as well as three bits of information (RCC) containing fixed stuff and stuff control, one byte of information (CCRRRRRR) containing stuff control and fixed stuff, and either seven or eight bits (CCRROORS) containing stuff control, fixed stuff and overhead communication bits. Whether seven or eight bits are removed from byte CCRROORS depends on whether the stuff opportunity bit S of the particular signal contains data or stuff. Knowledge of whether bit S is a stuff or a data signal is obtained from the stuff control signals C. Details of the STS-1 frame format and the means used to remove the overhead, stuff, and control information from the STS-1 signal are not particularly relevant to the instant invention, but may be seen with reference to prior art documents: Bellcore TR-TSY-000253; ANSI - T1.105-1988; and ANSI - Draft Proposed Technical Report T1X1/90-029. What is relevant, is that the data signal received from whatever is removing the overhead, stuff and control information of the STS-1 signal is a severely gapped data signal with a six hundred twenty-one or twenty-two data bits per row at a clock rate of 51.84 MHz±20 ppm, and an average rate of 44.736 MHz±20 ppm. This gapped STS-1 data payload signal is then preferably transformed into an ungapped DS-3 signal at the 44.736 MHz±20 ppm rate.

SUMMARY OF THE INVENTION

It is therefore the object of the invention to provide an apparatus which receives the gapped data component of an STS-1 signal and provides therefrom an ungapped DS-3 data signal.

In accord with the object of the invention, an apparatus which receives a gapped data component of an STS-1 signal and provides therefrom an ungapped DS-3 data signal is provided and broadly comprises a FIFO means for receiving the data component of the STS-1 signal, a measuring circuit having an input clock related to the STS-1 signal and the output clock of the apparatus as inputs for effectively measuring the relative fullness of the FIFO means, and a voltage controlled crystal oscillator (VCXO) for receiving a control signal from the measuring circuit and for generating the output clock of the apparatus in response thereto, where data in the FIFO means is taken out of the FIFO means as the DS-3 signal according to the rate of the output clock.

According to certain preferred aspects of the invention, the FIFO means is a byte RAM, and the measuring circuit is comprised of two counters, an XOR gate, and a low pass filter. One counter of the measuring circuit (i.e. the read counter) receives the apparatus output clock as its input, while the other counter (i.e. the write counter) effectively receives a gapped STS-1 data payload input clock as its input. The msb's of the counters are compared by the XOR gate, and the (filtered) duty cycle of the XOR gate output effectively provides an indication of the difference between the average rates of the input and output clocks. The low pass filter effectively filters out high frequency changes in the duty cycle due to the gapped nature of the input clock, and provides the VCXO with a dc signal which will change with changes in the dc component of the duty cycle. With a change in the input dc signal to the VCXO, the VCXO changes the output clock rate. Because the output clock is fed back to one of the counters of the measuring circuit, a closed loop (i.e. feedback) system is established.

A better understanding of the invention and additional advantages and objects of the invention will become apparent to those skilled in the art upon reference to the detailed description taken in conjunction with the accompanying drawings.

DETAILED DESCRIPTION OF THE PREFERRED EMBODIMENTS

Figure 2:
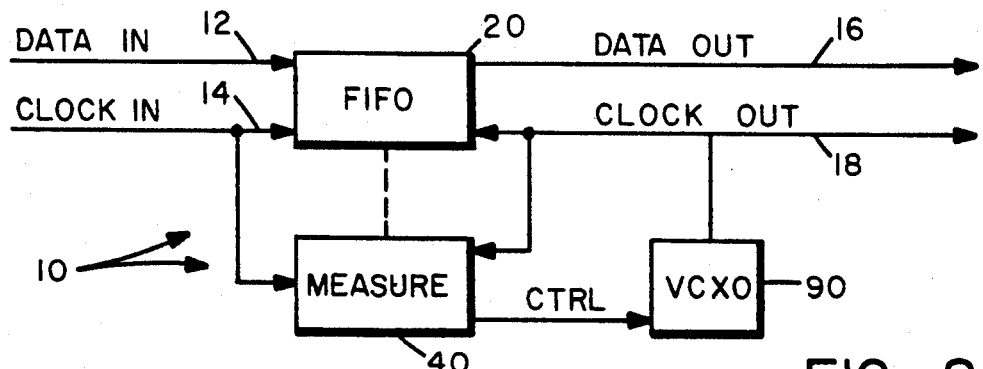
FIG. 2 is a high level block diagram of the apparatus of the invention for generating an ungapped DS3 signal from the data component of a gapped STS-1 payload signal.
Figure 1:
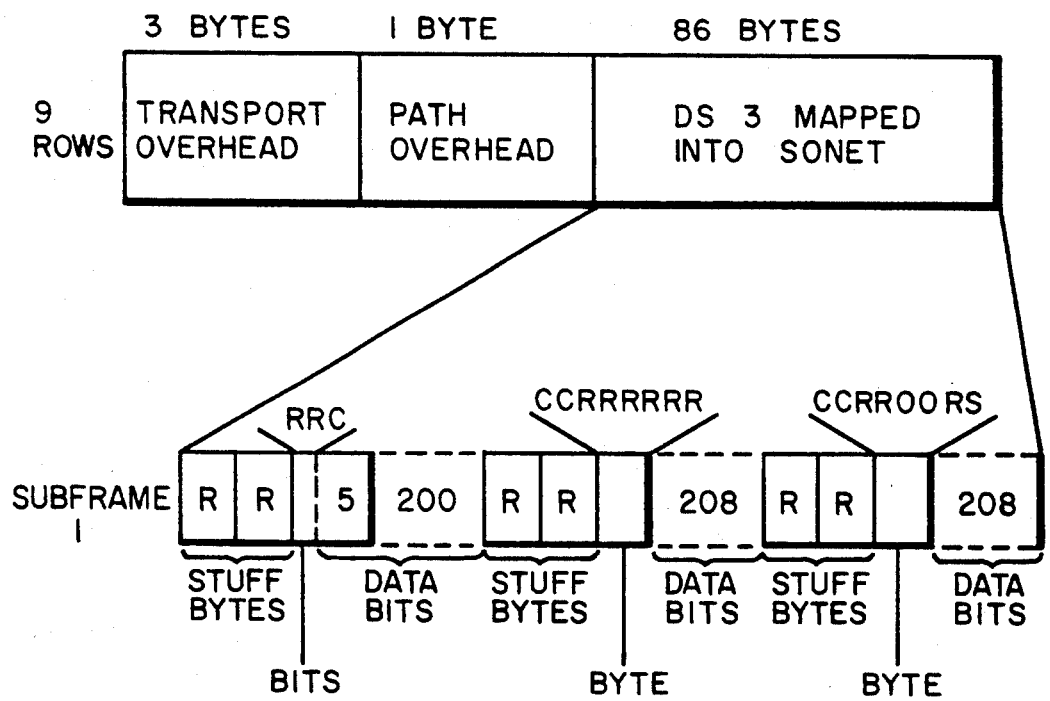
FIG. 1 is a prior art diagram showing the types of information contained in atypical STS-1 signal.

The desynchronization apparatus of the invention 10 for generating an ungapped DS3 signal from the data component of a gapped STS-1 payload signal is seen generally in FIG. 2. The desynchronization apparatus includes a FIFO means 20, a measuring circuit 40, and a voltage controlled crystal oscillator 90. The FIFO means 20 receives the data component of the STS-1 payload signal (i.e. data In 12) according to a gapped clock signal "clock In" 14 generated by a demultiplexer (not shown) of a preprocessing block (now shown). The clock In signal 14 as measured by its pulse width is typically 51.84 MHz±20 ppm. However, the average rate of the clock In signal is actually only 44.736±20 ppm due to the fact that there are large gaps in the signal.

Data is preferably taken from the FIFO 20 (at data Out 16) at the same rate at which it is received, and it is the function of the desynchronization apparatus 10 to generate a clock Out signal 18 which matches the average rate of the data In signal 12 with a minimum of jitter. For purposes herein, jitter is defined as the variation in the time of occurrence of an individual clock edge of a clock with respect to the average time of occurrence of the clock edge of that clock.

In order to generate an appropriate clock Out signal 18, the clock In signal 14 and clock Out signal 18 are fed to the measuring circuit 40. As will be described in more detail hereinafter with reference to FIG. 3, the measuring circuit makes a comparison of indications related to the clock In and clock Out signals to effectively determine whether FIFO 20 is filing up with data, or is being depleted of data. As a result of the comparison, the measuring circuit 40 provides a control signal to the VCXO 90 which helps control the VCXO clock output.

Figure 3:
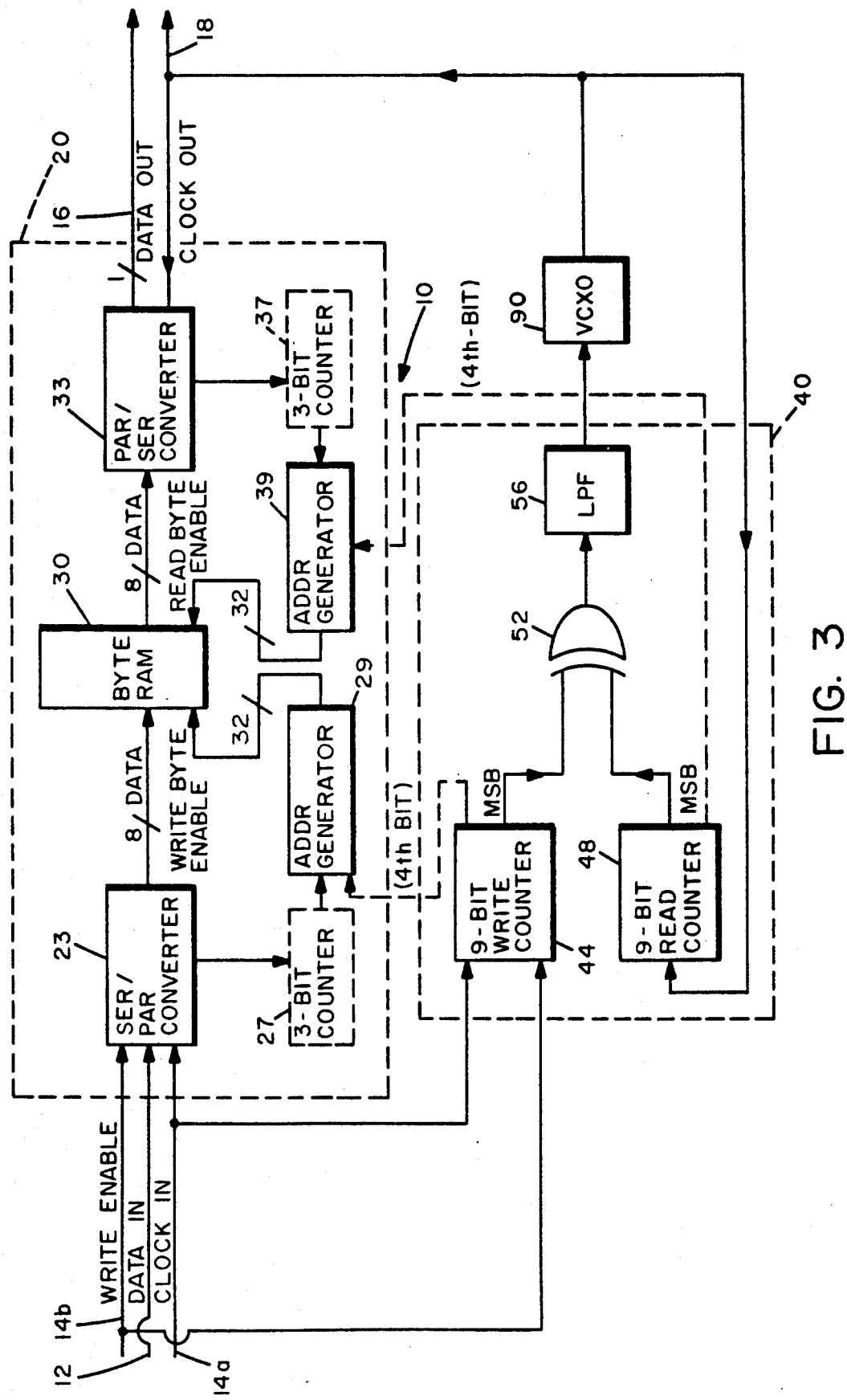
FIG. 3 is a detailed block diagram of a preferred embodiment of the apparatus of FIG. 2.

Turning to FIG. 3, a more detailed block diagram is seen of the preferred apparatus 10 of the invention. As indicated in FIG. 3, the FIFO means 20 is implemented with a "write side" serial to parallel converter 23, a "write side" three bit counter 27 (shown in phantom because it can be replaced by a signal from the nine bit binary counter 44 as discussed below), a "write side" address generator 29, a thirty-two byte RAM 30, and a "read side" parallel to serial converter 33, a "read side" three bit counter 37 (shown in phantom because it can be replaced by a signal from the nine bit binary counter 48 as discussed below), and a "read side" address generator 39. The measuring circuit 40 is implemented with the nine bit write counter 44, the nine bit binary read counter 48, an exclusive OR (XOR) gate 52, and a low pass filter 56.

Looking first at the FIFO means 20, a data In signal 12, and clock In and write enable signals 14a and 14b are received by the serial/parallel converter 23 from a preprocessing block (not shown). The write enable signal indicates when the data signal being received is the data component of the STS-1 payload. Thus, the write enable signal 14b effectively gaps the clock In signal 14a, and the data accepted by the serial/parallel converter is the gapped data component of the STS-1 payload.

The serial/parallel converter receives the bit serial stream of data, and provides therefrom either bit bytes of data which are sent for storage in the byte RAM 30. As the bits are received by the serial/parallel converter, a three bit counter 27 counts the bits (or gapped clock cycles), and sends a control signal to the address generator 29 every time eight bits have been counted; i.e. when a byte of data is available. The address generator 29 is preferably a recirculating thirty-two bit shift buffer having a single one value, with the remainder zeros. When the control signal from the three bit counter 27 is received by the address generator 29, the address generator 29 shifts its values. As a result, the next byte location in the thirty-two byte RAM 30 is enabled, and the eight bit byte of data is written to the enabled location.

The read side of the FIFO circuit 20 essentially parallels the write side, except that the read side parallel/serial converter 33 receives the output clock 18 as its input, and the read side three bit counter 37 counts eight output clock cycles in generating a control signal for the read side address generator 39. Address generator 39 is also a thirty-two bit shift register which is preferably initialized with its "1" value sixteen bits away from the "1" value location in address generator 29; i.e. the first byte of data read from byte RAM 30 is taken from a location sixteen bytes away in byte RAM 30 from where the first byte of data is written. By separating the read and write addresses in this manner, the byte RAM 30 provides enough buffer for desynchronizing the evenly clocked outgoing DS3 signal from the gapped data component of the STS-1 signal.

As aforementioned, the measuring circuit 40 makes a comparison of indications related to the clock In and clock Out signals to effectively determine whether the FIFO means 20 (i.e. the byte RAM 30) is filing up with data, or is being depleted of data. The measuring circuit accomplishes its determination by feeding the gapped clock In signal to counter 44, the output clock signal to counter 48, feeding the msb of each counter into an XOR gate 52 and low pass filtering the output of the XOR gate 52 with the low pass filter 56. In particular, the write enable and clock In signals 14a and 14b are used as inputs to counter 44 which effectively counts cycles of a gapped write clock. Counter 44 is preferably a nine bit binary counter, although a different size counter could be utilized depending upon how quickly changes in output clock rates are desired. With a nine bit binary counter, eight bits relate to all bit locations in the thirty-two byte RAM 30; three bits for each byte, and five bits to specify a particular byte. Thus, the change of the ninth bit indicates that the address generator 29 has gone through an entire cycle; i.e. the byte RAM has been completely rewritten with data. Also, the change of the fourth bit indicates that an entire byte has been received. Thus, as seen in phantom in FIG. 3, the fourth bit (or the first three bits together) may be used as the shift control for the address generator 29 instead of three bit counter 27.

The output clock signal 18 is similarly fed to a nine bit binary counter 48 which indicates that the address generator 39 has gone through an entire cycle (i.e. thirty-two bytes have been read out of the byte RAM), and which may also be used, as shown in phantom, to replace the three bit counter 37. By taking the msb's of each of counters 44 and 48, and feeding them as inputs into the XOR gate 52, the XOR gate will provide a signal whose duty cycle relates to the relative speeds at which the byte RAM is being filled and emptied. For example, if the address generator points are initialized to be sixteen bytes apart, and they stay sixteen bytes apart, the output of XOR gate will be a signal which half the time is at the value one, and half the time is at a value zero. Thus, the duty cycle of the XOR output signal is fifty percent. However, if data is fed into the byte RAM faster than it is taken out, the duty cycle will increase, as the time during which the msb's are a different value will increase. The time during which the msb's are a different value will increase because the change of the msb of the write counter 44 will occur earlier than before, while the change of the msb of the read counter 48 will occur at the same time. Conversely, if the data taken out of the byte RAM is taken out faster than data is being fed into the byte RAM, the duty cycle of the XOR output signal will decrease.

Because the data component of the STS-1 payload is a severely gapped signal, it will be appreciated by those skilled in the art that the duty cycle of particular outputs from the XOR gate will vary significantly in both directions. In order to eliminate the effect of these high frequency disturbances, the output from the XOR gate is fed through a low pass filter 56 which is preferably comprised of a 10K resister and a 0.1 microfarad capacitor. The low pass filter 56 effectively averages the duty cycle of the output of the XOR gate over a long period of time (in relative terms compared to the high rate signals being received and regenerated). The output of the low pass filter is a voltage signal which varies slightly in response to slow changes in the duty cycle of the XOR gate output; i.e. in response to the dc compont of the duty cycle. For example, for a five volt system, a long term fifty percent duty cycle signal would produce a 2.5 V (2.5 V=(50%)5 V) output. For a long term fifty-one percent duty cycle (the signal is high 51% of the time), the output voltage would be 2.55 V (2.55 V=(51%)5 V). The output voltage signal from the low pass filter is fed to the VCXO which changes its clock output only slightly in response to such a change in voltage. The change in output frequency depends on the change in voltage, and the gain constant of the VCXO. Preferred gain constants are between 50 and 150 ppm per volt. Thus, for a VCXO having a gain constant of 100 ppm per volt, and producing a nominal frequency of 44.736 MHz, and the long term change in the dc component of the duty cycle from fifty to fifty-one percent (which would be an extraordinarily large change as discussed below) would result in a frequency change of approximately 224 Hz: 44.736 MHz×100 ppm×0.05 V.

When the rate of the output clock is increased or decreased in response to the voltage signal sent by the low pass filter 56 to the VCXO 90, the data is taken from the byte RAM 30 accordingly, and the rate at which the nine bit counter 48 counts is also changed accordingly. Thus, a feedback loop is generated, which tends to force the duty cycle of the XOR gate 52 to an equilibrium; e.g. fifty percent. Similarly, the depth of the FIFO, i.e., the number of bytes in RAM 30, is force toward being sixteen bytes, i.e. fifty percent full.

It should be appreciated that the equilibrium point of the duty cycle of the XOR gate signal can be changed, e.g., by changing the voltage offsets in the loop, and need not be fifty percent. For example, it might take 2.8 V instead of 2.5 V for the VCXO to output the 44.736 MHz nominal rate. In that case, in order to maintain equilibrium, the equilibrium of the system will be maintained with the fullness of the FIFO at other than fifty percent. Similarly, the voltages of the system might change while running without a change in data rates. In that situation, if for example, the voltage to the VCXO is increased, at first the VCXO increases its output clock rate. However, since the input data rate had not increased, the increase in the output clock rate will cause a decrease in duty cycle as data will be read from the FIFO faster than it is being placed in the FIFO. With a decreased duty cycle, the voltage to the VCXO is decreased until equilibrium is reached at a lower duty cycle and a less filled FIFO.

It should also be appreciated that by providing large capacity binary counters, by filtering the output signal of the XOR gate to eliminate high frequency changes, and by using a VCXO which is relatively insensitive to voltage changes, a stable system which meets Standards requirements is provided. The large capacity binary counters guarantee that when the gapped data input has one more or one fewer bit over a particular time interval, the duty cycle will not change dramatically. For example, with nine bit binary counters preferably tracking a thirty-two byte RAM, the duty cycle will change by approximately four tenths of one percent (50–50 to 50.4–49.6) in response to a one bit change over the thirty-two bytes. While, because of the large gaps in the incoming signal, the duty cycle might swing tens of percent in one way or the other in the very short term, these high frequency changes are filtered out by the low pass filter, and only changes over a relatively long period of time will affect the output clock rate. Over the long term, large changes in clock rates are not permitted according to Standards, and therefore, a dc duty cycle change of even one percent would be extremely large. Further, by using an insensitive VCXO, only a very small output clock change is generated in response to the voltage change.

Figure 4:
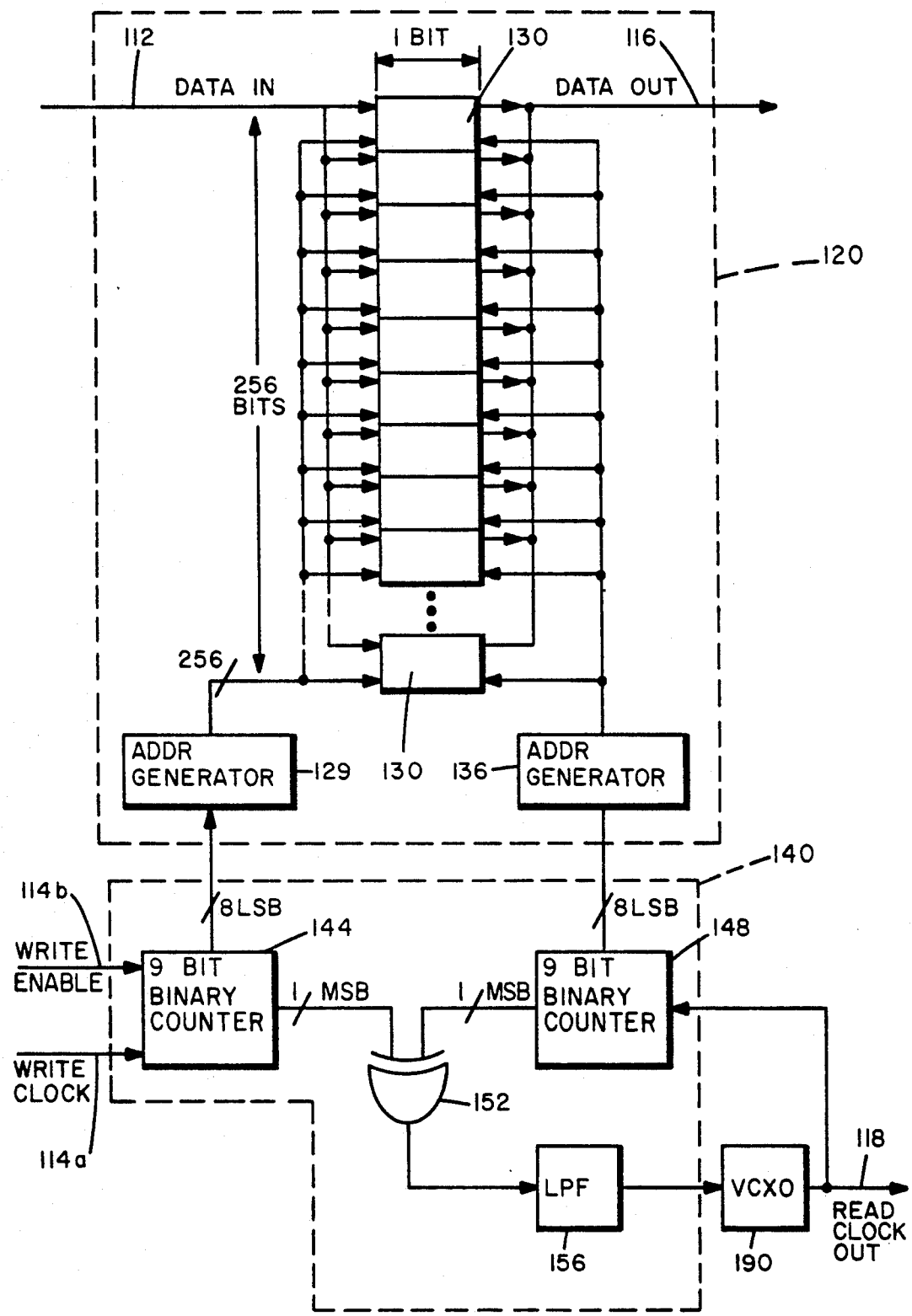
FIG. 4 is a block diagram of an alternative embodiment of the apparatus of FIG. 1.

Turning to FIG. 4, an alternative embodiment of the invention is shown. In FIG. 4, an apparatus 100 is provided with a FIFO means 120 which includes a one bit wide, two hundred fifty-six bit long RAM 130, and two address generators 129 and 139. The address generators 129 and 139 are preferably two hundred fifty-six bit long shift registers with a single one value. The measuring circuit 140 is identical to the measuring circuit 40 of FIG. 3 and includes two nine bit counters 144 and 148, and XOR gate 152, and a low pass filter 156. The output of the LPF 156 is sent to a VCXO 90 which provides the output clock which is fed back to the nine bit binary counter 148.

The primary differences between the apparatus of FIG. 4 and that of FIG. 3, is that the data is fed into RAM 130 in a bit serial fashion which obviates the need for the serial/parallel and parallel/serial converters as well as the three bit counters, and that the location in RAM 130 into which the bits are fed is dictated by the eight least significant bits (lsb's) of the binary counters 144 and 148. However, by requiring that data is fed into the RAM 130 one bit at a time, an extremely fast circuit is required, making implementation more difficult and expensive.

There has been described and illustrated herein apparatus for generating an ungapped DS3 signal from the data component of a gapped STS-1 payload signal. While particular embodiments of the invention have been described, it is not intended that the invention be limited thereby, as it is intended that the invention be broad in scope and that the specifications be read likewise. Thus, while byte and bit wise RAMs were described for use as FIFO means, it will be appreciated that other types of FIFOs such as a bit serial asynchronous FIFO could be used. In fact, regardless of the type of FIFO means utilized, shift register address generators are not required, and could be replaced with binary counters. Also, while an XOR gate for comparing the msb's of two binary counters was described for providing an indication of the fullness of the FIFO means, it will be appreciated that other measuring means could be utilized. For example, a comparator for comparing (subtracting) the counts of the counters could be utilized to provide an indication of fullness. Or, a comparator for comparing the address locations provided by the address generators could be utilized. It should be realized, however, that such comparators do not provide as desirable a measurement as the measurement obtained by the binary counters and XOR gate (which is filtered by the filter), as the measurement obtained with the comparator is typically both quantized in time and in amplitude. With the preferred means for measuring fullness of the FIFO, there is no amplitude quantization, as the binary counters are asynchronous, and the XOR gate provides a signal with a duty cycle which is not stepped. Also, because the measurement is continuous (due to asynchronous binary counters), the measurement is not quantized in time.

It will further be appreciated by those skilled in the art that while certain size RAMs and counters were described, and while values for the components of the low pass filter were provided, components of different sizes and values could be utilized effectively to tailor the circuit to desired parameters. In fact, different types of low pass filters could be utilized. Therefore, it will be apparent to those skilled in the art that other changes and modifications may be made to the invention as described in the specification without departing from the spirit and scope of the invention.

We claim:

1. An apparatus which receives a gapped data component of an STS-1 signal with an accompanying first clock signal and provides therefrom an ungapped DS-3 signal having a second clock signal, comprising:
   a) FIFO means for receiving and storing said data component of said STS-1 signal;
   b) a measuring circuit means having said first clock signal as a first input and said second clock signal as a second input, said measuring circuit means for providing an indication of relative fullness of said FIFO means; and
   c) a voltage controlled crystal oscillator coupled to said measuring circuit means for receiving said indication and for generating said second clock signal at least partially in response thereto, wherein said data component of said STS-1 signal stored in said FIFO means is clocked out of said FIFO means at the rate of said second clock signal, and together with said second clock signal comprises said ungapped DS-3 signal.

2. An apparatus according to claim 1, wherein:
said FIFO means comprises a RAM, a write address generator coupled to said RAM for enabling locations in said RAM, and a read address generator coupled to said RAM for enabling locations in said RAM,
data is clocked out of said FIFO means according to locations in said FIFO means enabled by said read address generator, and
data is clocked into said FIFO means according to locations in said FIFO means enabled by said write address generator.

3. An apparatus according to claim 2, wherein:
said write address generator is first recycling shift register, and
said read address generator is a second recycling shift register.

4. An apparatus according to claim 2, wherein:
said gaped data component of said STS-1 signal is a bit serial signal,
said RAM is a byte wide RAM, and
said FIFO means further comprises a serial/parallel converter coupled to said byte wide RAM for receiving said bit serial signal and providing byte parallel signals to said byte wide RAM, a first counter coupled to said write address generator for tracking formation of said byte parallel signals and for providing an indication thereof to said write address generator, a parallel/serial converter coupled to said byte wise RAM for receiving said byte parallel signals stored in said byte wise RAM and for generating therefrom in conjunction with said second clock a bit serial DS-3 signal, and a second counter coupled to said read address generator for counting eight clock cycles of said second clock and providing an indication thereof to said read address generator.

5. An apparatus according to claim 1, wherein:
said measuring circuit means is comprised of a first binary counter for counting said first clock signal cycles, a second binary counter for counting said second clock signal cycles, logic means coupled to said first and second binary counters for comparing a bit of said first binary counter with a bit of said second binary counter and providing a comparison output in response thereto, a low pass filter coupled to said logic means and to said voltage controlled crystal oscillator for filtering out high frequency components of said comparison output and for providing a voltage signal to said voltage controlled crystal oscillator, said voltage signal constituting said indication of relative fullness of said FIFO means.

6. An apparatus according to claim 5, wherein:
said bit of said first counter and said bit of said second counter are corresponding bits.

7. An apparatus according to claim 6, wherein:
said bit of said first binary counter is the most significant bit of said first binary counter, and said bit of said second binary counter is the most significant bit of said second binary counter.

8. An apparatus according to claim 5, wherein:
said logic means is an exclusive OR (XOR) gate.

9. An apparatus according to claim 7, wherein:
said logic means is an exclusive OR (XOR) gate.

10. An apparatus according to claim 5, wherein:
said FIFO means comprises a RAM, a write address generator coupled to said RAM for enabling locations in said RAM, and a read address generator coupled to said RAM for enabling locations in said RAM,
data is clocked out of said FIFO means according to locations in said FIFO means enabled by said read address generator, and
data is clocked into said FIFO means according to locations in said FIFO means enabled by said write address generator.

11. An apparatus according to claim 10, wherein:
said gapped data component of said STS-1 signal is a bit serial signal,
said RAM is a byte wide RAM, and
said FIFO means further comprises a serial/parallel converter coupled to said byte wise RAM for receiving said bit serial signal and providing byte parallel signals to said byte wide RAM, and a parallel/serial converter coupled to said byte wide RAM for receiving said byte parallel signals stored in said byte wide RAM and for generating therefrom in conjunction with said second clock a bit serial DS-3 signal.

12. An apparatus according to claim 11, wherein:
said FIFO means further comprises a third counter coupled to said write address generator for tracking formation of said byte parallel signals and for providing an indication thereof to said write address generator, and a fourth counter coupled to said read address generator for counting eight clock cycles of said second clock and providing an indication thereof to said read address generator.

13. An apparatus according to claim 11, wherein:
said first binary counter is coupled to said write address generator and tracks formation of said byte parallel signals and provides an indication thereof to said write address generator, and said second binary counter is coupled to said read address generator and counts eight clock cycles of said second clock and provides an indication thereof to said read address generator.

14. An apparatus according to claim 10, wherein:
said gapped data component of said STS-1 signal is a bit serial signal,
said RAM is a bit wide RAM, and
said first binary counter is coupled to said write address generator, and said second binary counter is coupled to said read address generator.

15. An apparatus according to claim 1, wherein:
said accompanying first clock signal is a gapped clock signal comprised of the logical combination of a write enable clock signal and a clock in signal.

16. An apparatus according to claim 10, wherein:
said accompanying first clock signal is a gapped clock signal comprised of the logical combination of a write enable clock signal and a clock in signal.

17. An apparatus which receives a gapped data component of an STS-1 signal with an accompanying first clock signal and provides therefrom an ungapped DS-3 signal having a second clock signal, comprising:
 a) FIFO means for receiving and storing said data component of said STS-1 signal;
 b) a measuring circuit means having said first clock signal as a first input and said second clock signal as a second input, said measuring circuit means for providing a voltage signal unquantized in amplitude and unquantized in time and related to the difference in average rates of said first and second clock signals; and
 c) a voltage controlled crystal oscillator coupled to said measuring circuit means for receiving said voltage signal and for generating said second clock signal at least partially in response thereto, wherein said data component of said STS-1 signal stored in said FIFO means is clocked out of said FIFO means at the rate of said second clock signal, and together with said second clock signal comprises said ungapped DS-3 signal.

18. An apparatus according to claim 17, wherein:
said measuring circuit means is comprised of a first binary counter for counting said first clock signal cycles, a second binary counter for counting said second clock signal cycles, logic means coupled to said first and second binary counters for comparing a bit of said first binary counter with a bit of said second binary counter and providing a comparison output in response thereto, a low pass filter coupled to said logic means and to said voltage controlled crystal oscillator for filtering out high frequency components of said comparison output and for providing said voltage signal to said voltage controlled crystal oscillator.

19. An apparatus according to claim 18, wherein:
said FIFO means comprises a RAM, a write address generator coupled to said RAM for enabling locations in said RAM, and a read address generator coupled to said RAM for enabling locations in said RAM,
data is clocked out of said FIFO means according to locations in said FIFO means enabled by said read address generator, and
data is clocked into said FIFO means according to locations in said FIFO means enabled by said write address generator.

20. An apparatus according to claim 19, wherein:
said accompanying first clock signal is a gapped clock signal comprised of the logical combination of a write enable clock signal and a clock in signal.

* * * * *